United States Patent
Ackermann

(10) Patent No.: US 6,565,980 B1
(45) Date of Patent: May 20, 2003

(54) SAFETY GLASS CONSTRUCTION FOR SAFETY MOTOR VEHICLES

(75) Inventor: Jorg Ackermann, Pliezhausen (DE)

(73) Assignee: Sachsenring Entwicklungs Gesellschaft mbH, Zwickau (DE)

( * ) Notice: Subject to any disclaimer, the term of this patent is extended or adjusted under 35 U.S.C. 154(b) by 0 days.

(21) Appl. No.: 09/601,392

(22) PCT Filed: Jan. 27, 1999

(86) PCT No.: PCT/DE99/00251

§ 371 (c)(1),
(2), (4) Date: Jul. 31, 2000

(87) PCT Pub. No.: WO99/39152

PCT Pub. Date: Aug. 5, 1999

(30) Foreign Application Priority Data

Jan. 29, 1998 (DE) .......................................... 198 03 435

(51) Int. Cl.⁷ .............................................. B32B 25/00
(52) U.S. Cl. ............... 428/425.6; 428/426; 296/144.15; 296/188
(58) Field of Search ............................... 428/192, 425.6, 428/425.8, 426, 911; 89/36.02, 36.01, 36.04; 109/49.5; 296/84.1, 188, 144.15; 427/389.7

(56) References Cited

U.S. PATENT DOCUMENTS

| 3,616,122 A | 10/1971 | Orcutt |
| 4,277,294 A | 7/1981 | Orcutt |
| 4,284,677 A | 8/1981 | Herliczek |

FOREIGN PATENT DOCUMENTS

| DE | 3639781 | 11/1986 |
| DE | 92055266 | 4/1992 |
| DE | 4142416 | 6/1993 |
| DE | 4336321 | 10/1993 |
| DE | 4314092 | 1/1994 |
| DE | 4230073 | 3/1994 |
| DE | 4415879 | 11/1995 |
| DE | 19543127 | 11/1995 |
| DE | 19548338 | 12/1995 |
| DE | 19601982 | 1/1996 |
| DE | 19729897 | 10/1998 |
| DE | 19745248 | 4/1999 |
| EP | 302959 | 8/1987 |
| EP | 0658738 | 6/1995 |
| GB | 2144834 | 3/1985 |
| WO | 9857805 | 12/1998 |

*Primary Examiner*—Deborah Jones
*Assistant Examiner*—Abraham Bahta
(74) *Attorney, Agent, or Firm*—Horst M. Kasper

(57) ABSTRACT

The invention relates to a safety glass construction for safety motor vehicles whose body parts are lined with bullet-proof matting or other bullet-proof material in a direction toward the passenger area. The motor vehicle has an armored pane in which at least one pane (3.1) made of safety glass or one pane packet comprises of at least two bonded panes (3.1 and 3.2) also made of safety glass is connected to the outer pane (2). A strip (1) made of a bullet-proof material is arranged between the outer pane (2) and the pane packet (3) and/or between at least two panes (3.1, 3.2) of the pane packet (3) and/or on the pane of the packet (3) pointing toward the passenger area. Said strip overlaps the area up to the bullet-proof matting (5) or to the bullet-proof material of the connecting body parts (7).

14 Claims, 4 Drawing Sheets

SAFETY GLASS CONSTRUCTION FOR SAFETY MOTOR VEHICLES

Figure 1:
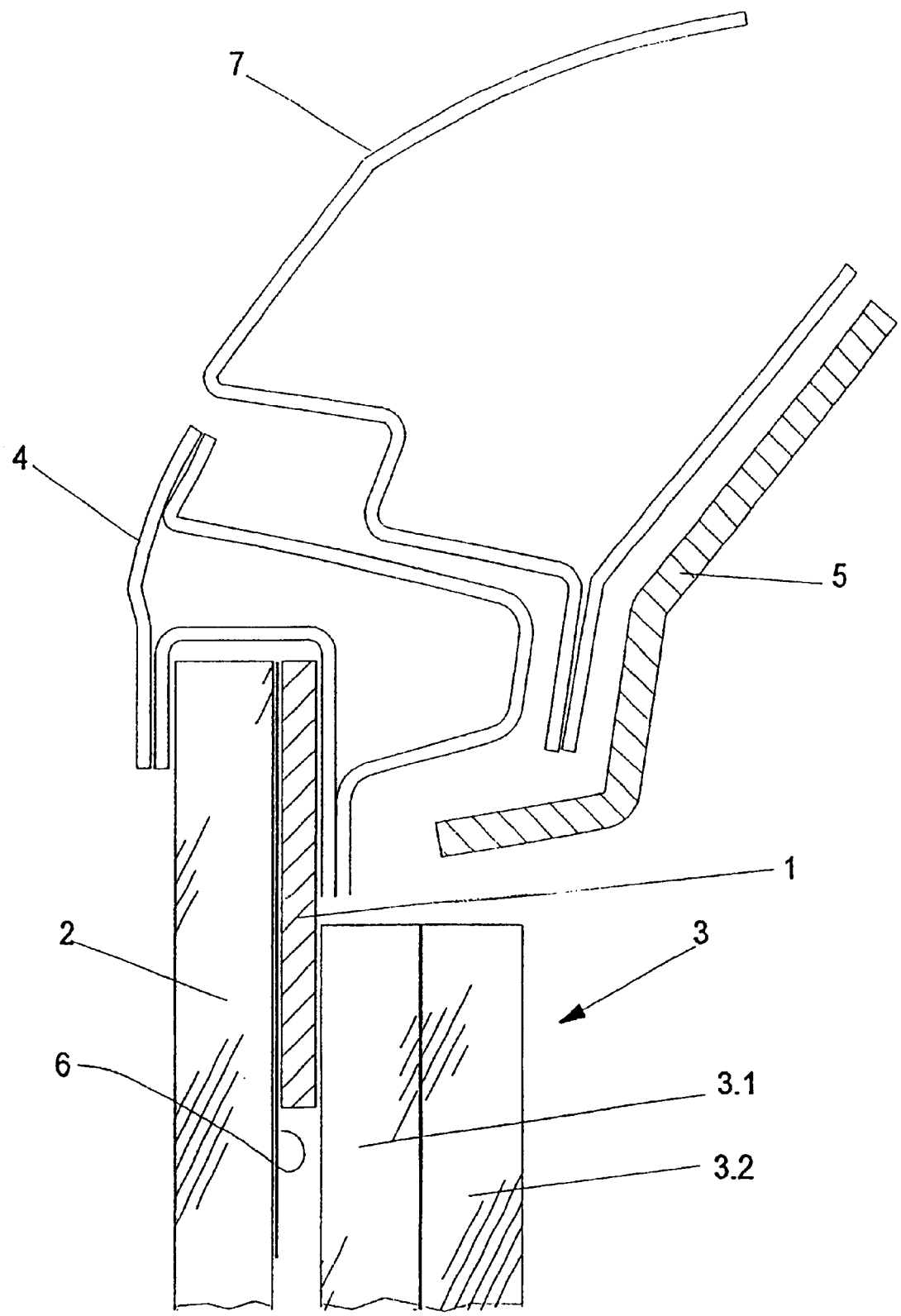

(a) CROSS-REFERENCE TO RELATED APPLICATIONS (not applicable)

(b) STATEMENT REGARDING FEDERALLY SPONSORED RESEARCH OR DEVELOPMENT (not applicable)

(c) INCORPORATION-BY-REFERENCE OF MATERIAL SUBMITTED ON A COMPACT DISC (not applicable)

(d) BACKGROUND OF THE INVENTION

(1) Field of the Invention

The invention relates to a safety glass construction for security motor vehicles according to the preamble of the first patent claim, which security motor vehicles exhibit an armored disk wherein the body parts of the armored disk are lined with bulletproof mats or other bulletproof materials in the direction of the passenger space.

(2) Description of Related Art Including Information Disclosed Under 37 CFR 1.97 and 1.98

Numerous solutions are known for the construction of safety panes for motor vehicles, wherein in most cases several compound glass panes are composed of tampered safety glass panes, wherein intermediate spaces filled with foils or fluids are furnished between the compound glass panes and wherein one or several layers can comprise polycarbonate glass (German printed patent document DE 4336321 A1, German printed patent document DE 19548338 A1, European patent document EP 302959 A1). A bulletproof glass pane in the step glass construction is described in the German printed patent document DE 3639781 C1, wherein the bulletproof glass pane is inclined at its upper edge in the direction to the motor vehicle inner space and wherein the thereby formed wedge gap is covered with an armored plate disposed in the inner space. The armored plate is here not attached to the armored glass pane. The support and guiding of the bulletproof glass pane forms a frame profile, wherein the frame profile delimits the bulletproof glass panes from above, from the front, and from the rear and is formed as a complex construction part. The frame profile exhibits a supplementing profile, wherein the supplementing profile has an essentially U-shaped cross-section and surrounds the edge of the bulletproof glass pane.

A window pane made of armored glass for motor vehicles is described in the German printed patent document DE 4142416 A1, wherein the window pane carries an armored element in the form of an angle running along the edge in the edge region. The angle thereby borders at a projection of the pane directed in the direction toward the outer side of the vehicle with an arm resting at the front side face of the pane and the other angle lies at the inside of the vehicle. The two constructions exhibit a high constructive building, because these U-shaped or angle shaped profiles have to follow exactly to the curved course of the front face of the armored pane. Furthermore it is in both cases necessary to lead the bombardment safe material over the edge region of the safety glass, in order to prevent, even under a speed angle, impacting projectiles from penetrating into the interior space of the vehicle, wherein the bombardment safe material is furnished in the interior space of the vehicle.

There are furthermore solutions known, which concern a lining of the body parts and their hollow spaces with the bombardment safe material. A solution relative to bombardment safe mats, in particular for the covering of vehicle walls, is described in the German printed patent document DE 19543127 A1, wherein the bombardment safe mats comprise several plastic fabric layers connected to each other.

Also hollow spaces with a flexible profile out of bombardment safe material, wherein the profile is adapted to the dimensions of the hollow spaces, are furnished according to the German printed patent document DE 1960192 C1. A basic problem comprises here that in particular the edge region of the outer pane is unprotected up to the edge region of the following safety pane packet. Therefore the bombardment safe material in the passenger space has to be lead over the region of the safety disk packet, in order to assure the required security. For this purpose a motor vehicle with an armored pane is described in the German printed patent document G 9205520.6 U1, wherein an overlapping armored gap covering is furnished for the protection of the interior space in that region, where the bulletproof glass pane exhibits a decreased thickness. However, the stepping in area of the vehicle is reduced thereby and thus the stepping in into the vehicle is interfered with. Furthermore this requires a very high cost expenditure during the production of the form parts out of the bombardment safe material, because the tools have to be formed with a relatively large size.

(e) BRIEF SUMMARY OF THE INVENTION

It is an object of the present invention to develop a bombardment safe glass construction for security motor vehicles, which assures the bombardment safety in the edge region of the outer glass, wherein the bombardment safe material of the passenger space is not led out up to the bulletproof pane packet and thus an interference of the stepping in is avoided and at the same time the costs for the production of the bulletproof panes and the bombardment safe linings are decreased.

This object of the present invention is resolved with the features of the first patent claim and with the further features in the sub claims of claim one. Here the outer pane is armored in a conventional way with at least one pane made out of bulletproof glass or a pane packet of at least two compound panes made out of bulletproof glass.

A flat strip made out of a bombardment safe material is disposed according to the present invention in the outer pane and the pane of bulletproof glass or, respectively, the pane packet and/or at least one pane of the pane packet, wherein the flat strip overlaps the region in the edge region of the pane of bulletproof glass or, respectively, the edge region of the packet of panes up to the bombardment safe mats or the bombardment safe material of the vehicle body parts joining to the packet of panes. Preferably a steel lining, for example, made out of armored steel, bombardment inhibiting ceramics or another bombardment inhibiting material is preferably selected as a strip material.

In all, to prevent the armoring from becoming visible from the outside, the strip can be covered by a coating applied from the inner side onto the outer pane.

The outer disk can comprise either a safety glass (bulletproof glass) or also an original ESG-glass.

(f) BRIEF DESCRIPTION OF THE SEVERAL VIEWS OF THE DRAWING(S)

The invention is explained in more detail by way of embodiments and associated drawings.

Figure 2:
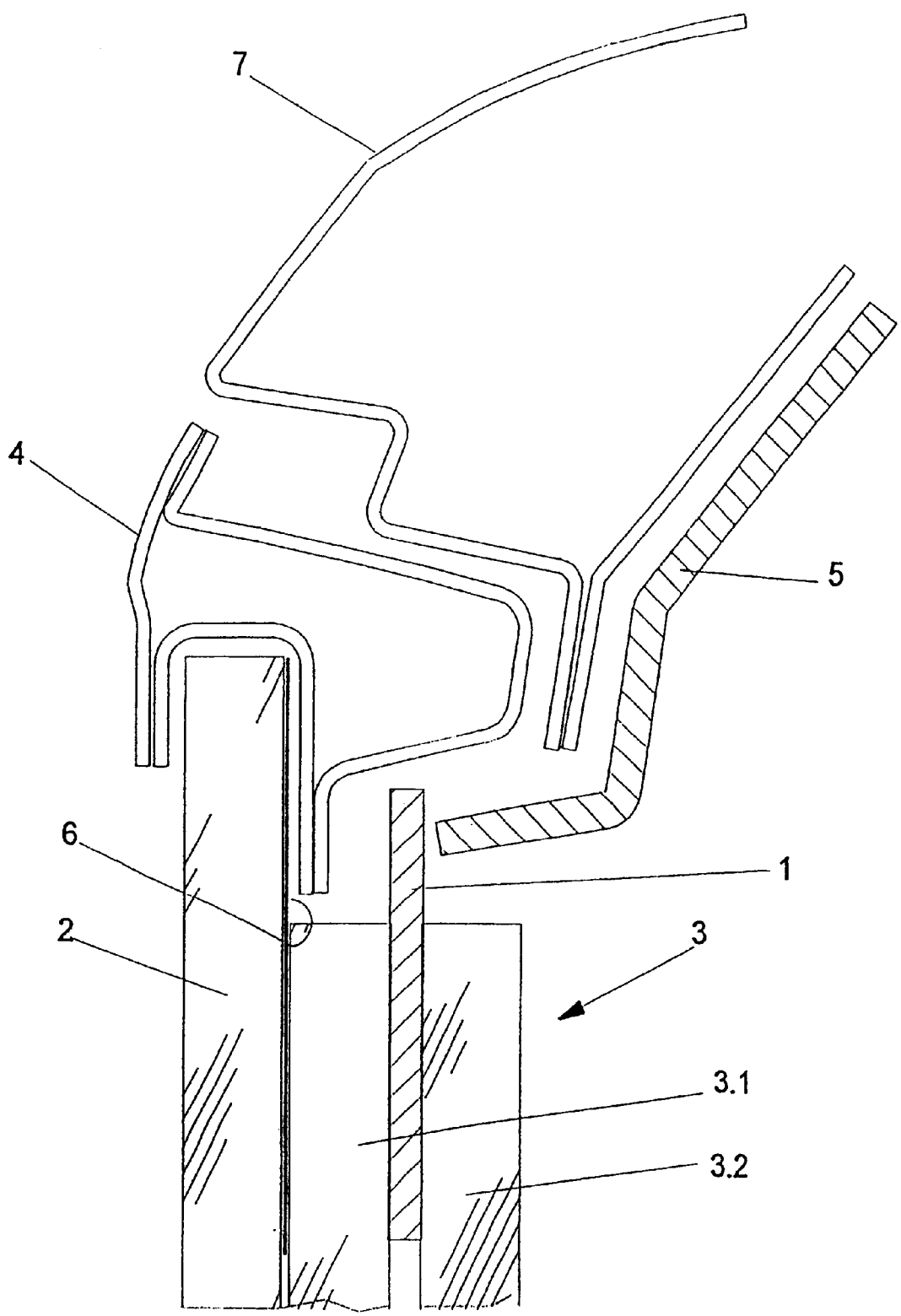
Figure 3A:
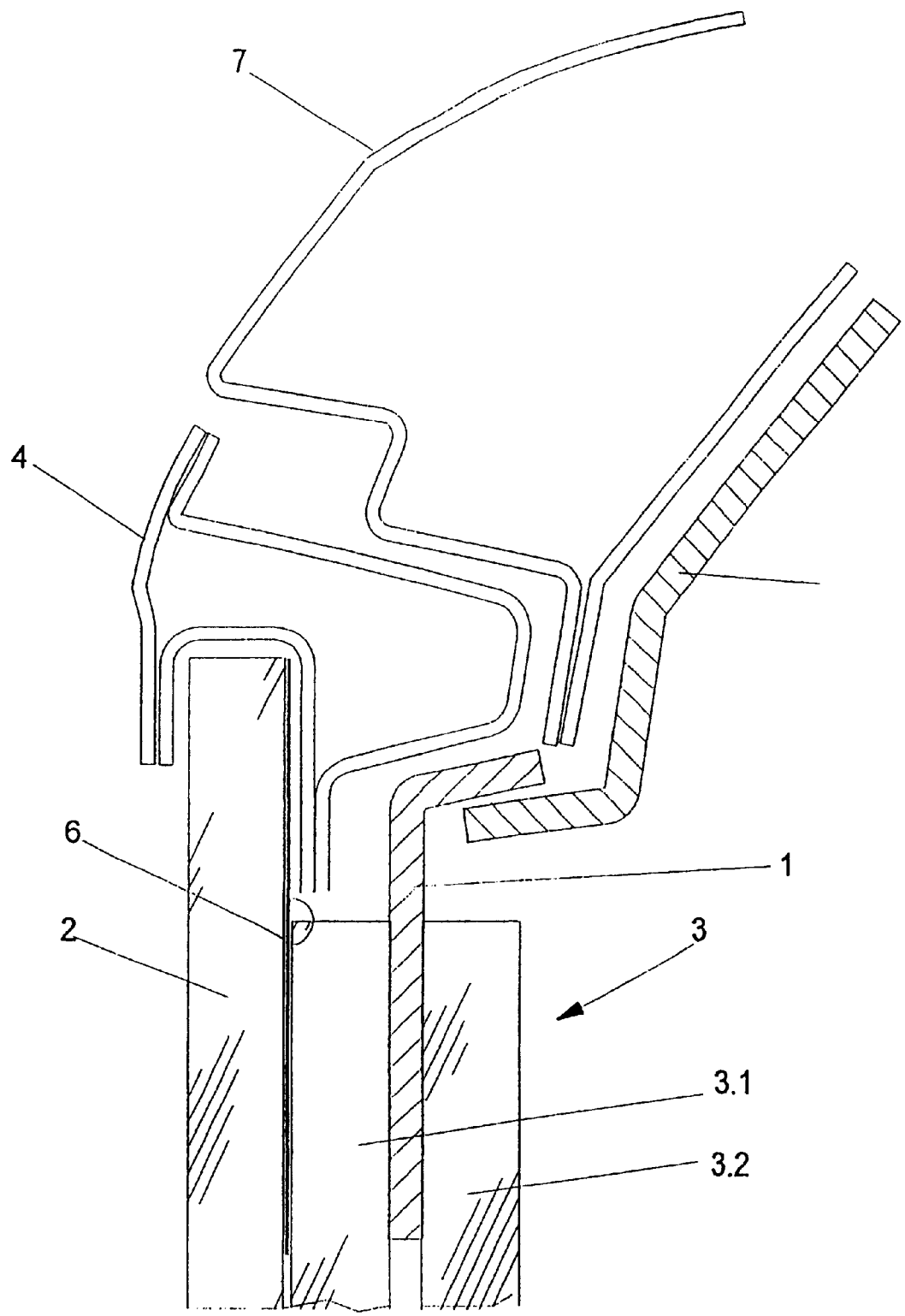
Figure 3B:
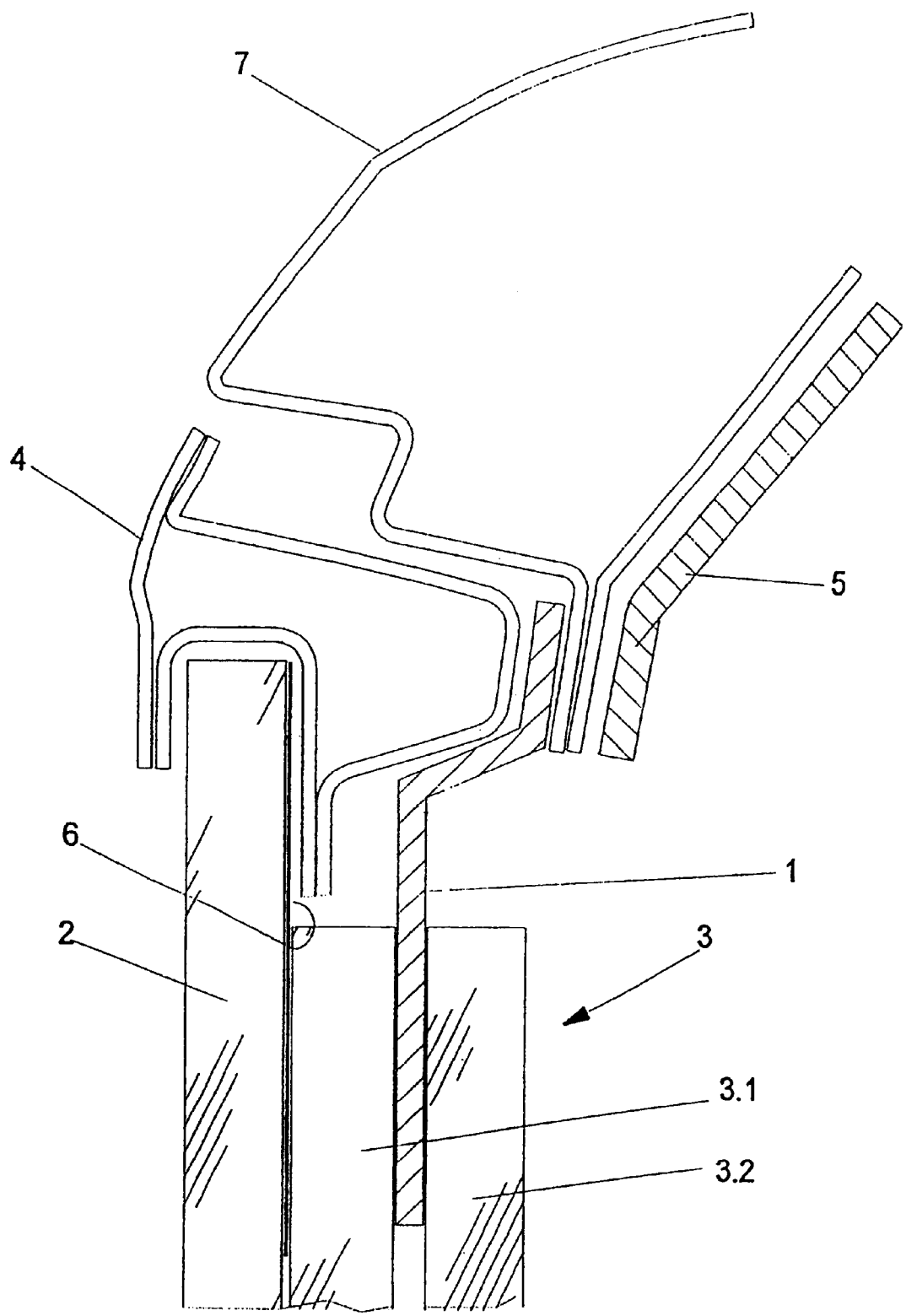

There is shown in:

FIG. 1: a bombardment safe strip between the outer glass and the packet of panes FIG. 2: a bombardment safe strip between two panes of the packet of panes FIG. 3a: a strip, simply bent in a direction toward the bombardment safe mats FIG. 3b: Z-shaped bent strip in a direction toward the bombardment safe mats

(g) DETAILED DESCRIPTION OF THE INVENTION

A safety glass construction is illustrated in FIG. 1 disposed in the vehicle door 4. A bombardment inhibiting strip 1 is disposed in the edge region of the outer pane 2 and between the outer pane 2 attached in the vehicle door 4 and the packet of panes 3 comprising several panes 3.1 and 3.2. It is thereby not any longer necessary to extend the bombardment safe mat 5 disposed in the joining body part 7 and to cover the edge region of the packet of panes 3. For avoiding the penetration of a projectile it is sufficient, if the strip 1 and the mat 5 sufficiently overlap. Preferably, the strip 1 is formed out of armored steel or bombardment safe ceramics.

According to a further embodiment according to FIG. 2, the strip 1 was disposed between two panes 3.1 and 3.2 of the packet of panes 3 and thus can be incorporated in the production of the packet of panes. The strip 1 reaches beyond the edge region of the packet of panes such, that the sufficient overlap is given with the armoring element 5 (for example bombardment inhibiting mat) in the body region of the vehicle.

A possibility of an embodiment illustrated in FIG. 3a and FIG. 3b comprises to bead over or, respectively, bent over the strip 1 regionally in the direction toward the armoring element 5. A variation with a simple bending of the strip 1 in protection to the passenger space is illustrated in FIG. 3a. An opening of the window is prevented according to this variation of an embodiment, which is required with the several types of security vehicles. In addition, the possibility exists to bend the strip in a Z-shape according to FIG. 3b, that the one bending is directed toward the passenger space and the second bending is directed away from the pane. The strip 1 can in this case for the first time reach over the edge region of the pane. Preferably, the strip 1 is formed circulating around pane 2, however also the possibility exists to furnish only three sides with a strip 1 or also to dispose the strip 1 only regionally.

A projectile penetration in the edge region of the outer glass is excluded, according to the solution of the present invention, without having to lead the bombardment safe material of the passenger space up to the armored pane packet. An interference of the stepping in is thus avoided, whereby simultaneously the costs for production of the bombardment safe linings are decreased. At the same time the expenditure for production of the panes is decreased, since the strip does not any longer run as a profile along at the front face of the pane, but is disposed simply between two panes.

As can be recognized from the drawings, the strip 1 can be covered by a coating 6 of the pane 2.

What is claimed is:

1. Safety glass construction for security motor vehicles with an armored pane, wherein at least one pane (3.1) comprising safety glass or a packet of panes of at least two compound panes (3.1,3.2) made of safety glass are connected to an outer pane (2), a strip (1) made out of bombardment safe material, which strip (1) is adjoining the armored pane, and bombardment safe mat or bombardment safe material, with which bombardment safe mat or bombardment safe material a part of the vehicle body is lined in a direction toward a passenger space, wherein the strip (1) is disposed between the outer pane (2) and the packet of panes (3) and/or between at least two panes (3.1,3.2) of the packet of panes (3) and wherein the strip (1) such protrudes over the outer pane that the strip (1) overlaps the region between the armored pane and the bombardment safe mat or bombardment safe material.

2. Safety glass construction according to claim 1, wherein the outer region of the strip (1) protruding the packet of panes (3) is sectionally bent over or beaded over in the direction of the bombardment safe mat (5) or the bombardment safe material of the following parts of the body (7) under blocking of the window opening in the direction toward the passenger space.

3. Safety glass construction according to claim 1, wherein the outer region of the strip (1) reaches over the packet of panes (3) or over the outer pane (2), and is regionally Z-shaped bent over or beaded over in the direction of the bombardment safe mat (5) or the bombardment safe material of the thereto following vehicle body parts (7) under release of the opening of the window.

4. Safety glass construction for security motor vehicles according to claim 1, wherein the strip (1) comprises armored steel, bombardment safe ceramics or a bombardment inhibiting material.

5. Safety glass construction for security motor vehicles according to claim 1, wherein the strip (1) is covered by a coating (6).

6. A safety glass construction for security motor vehicles comprising an outer pane (2);
   a first pane (3.1) comprising safety glass and disposed substantially in parallel to the outer pane (2) and connected to the outer pane (2);
   a strip (1) made out of bombardment safe material, wherein strip (1) is adjoining the first pane and disposed parallel to the first pane (3.1) and disposed closely spaced relative to the first pane (3.1);
   an armored sheet (5) furnishing a lining for a part of the vehicle body and disposed on an inner passenger side of the vehicle body,
   wherein the strip (1) such protrudes over the outer pane (2) that the strip (1) overlaps the region between the first pane and the armoring sheet (5).

7. The safety glass construction according to claim 6 further comprising a second pane (3.2) disposed in parallel and closely spaced to the first pane (3.1) on a side of the first pane located remote from the outer pane (2).

8. The safety glass construction according to claim 7 wherein the strip (1) is disposed between the outer pane (2) and the first pane (3.1).

9. The safety glass construction according to claim 7 wherein the strip (1) is disposed between the first pane (3.1) and the second pane (3.2).

10. The safety glass construction according to claim 6 wherein the strip (1) is disposed between the outer pane (2) and the first pane (3.1).

11. The safety glass construction according to claim 6, wherein the strip (1) is attached to the first pane (3.1), wherein an outer region of the strip (1) protrudes beyond the first pane (3.1), wherein the armored sheet (5) is attached to the part of the vehicle body, wherein the outer region of the strip (1) is bent over toward the armored sheet (5) and engages the armored sheet (5) such as to block a moving of the first pane (3.1) for opening a window.

12. The safety glass construction according to claim 7, wherein an outer region of the strip (1) reaches over the first pane (3.1) and over the second pane (3.2) or over the outer pane (2), and wherein the strip is regionally Z-shaped bent over in the direction of the armored sheet (5) which is attached to the vehicle body (7) and releases an opening of a window.

13. The safety glass construction according to claim 6, wherein the strip (1) comprises a member selected from the group consisting of armored steel, a bombardment safe ceramic material, a bullet proof material, and mixtures thereof.

14. The safety glass construction according to claim 6, wherein the strip (1) is covered by a coating (6).

* * * * *